(12) United States Patent
Grieco et al.

(10) Patent No.: US 9,928,369 B2
(45) Date of Patent: Mar. 27, 2018

(54) INFORMATION TECHNOLOGY VULNERABILITY ASSESSMENT

(71) Applicant: Cisco Technology, Inc., San Jose, CA (US)

(72) Inventors: Anthony H. Grieco, Wake Forest, NC (US); Adam J. O'Donnell, San Francisco, CA (US)

(73) Assignee: Cisco Technologies, Inc., San Jose, CA (US)

(*) Notice: Subject to any disclaimer, the term of this patent is extended or adjusted under 35 U.S.C. 154(b) by 0 days.

(21) Appl. No.: 14/617,184

(22) Filed: Feb. 9, 2015

(65) Prior Publication Data

US 2016/0232358 A1 Aug. 11, 2016

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .................................................... G06F 21/577
USPC ........................................................ 726/25
See application file for complete search history.

(56) References Cited

U.S. PATENT DOCUMENTS

| | | | |
|---|---|---|---|
| 6,907,531 B1 | 6/2005 | Dodd et al. | |
| 7,284,274 B1 | 10/2007 | Walls et al. | |
| 8,516,590 B1 * | 8/2013 | Ranadive | H04L 63/1433 713/187 |
| 8,713,684 B2 * | 4/2014 | Bettini | G06F 21/57 726/1 |
| 9,275,231 B1 * | 3/2016 | Chen | G06F 21/56 |
| 2007/0291682 A1 * | 12/2007 | Anjum | H04L 63/06 370/328 |
| 2008/0229420 A1 * | 9/2008 | Jeschke | H04L 63/1433 726/25 |
| 2012/0110174 A1 * | 5/2012 | Wootton | G06F 21/564 709/224 |
| 2012/0151585 A1 * | 6/2012 | Lamastra | H04L 12/585 726/24 |
| 2012/0210422 A1 | 8/2012 | Friedrichs et al. | |
| 2013/0139266 A1 | 5/2013 | Amit et al. | |
| 2013/0227683 A1 * | 8/2013 | Bettini | G06F 21/57 726/22 |

(Continued)

*Primary Examiner* — Matthew Henning
(74) *Attorney, Agent, or Firm* — Edell, Shapiro & Finnan, LLC (57) ABSTRACT

Presented herein are vulnerability assessment techniques for highlighting an organization's information technology (IT) infrastructure security vulnerabilities. For example, a vulnerability assessment system obtains application metadata for each of a plurality of executable applications observed at one or more devices forming part of an organization's IT infrastructure. The application metadata includes unique software identifiers for each of the plurality of executable applications. The vulnerability assessment system obtains global security risk metadata for executable applications observed at the one or more devices. The vulnerability assessment system maps one or more unique software identifiers in the application metadata to global security risk metadata that corresponds to applications identified by the one or more unique software identifiers, thereby generating a vulnerable application dataset.

20 Claims, 4 Drawing Sheets

(56) References Cited

U.S. PATENT DOCUMENTS

2013/0298244 A1\* 11/2013 Kumar .................... G06F 21/52
 726/25
2014/0380473 A1\* 12/2014 Bu .......................... G06F 21/53
 726/23
2017/0078322 A1\* 3/2017 Seiver ................. H04L 43/0876

\* cited by examiner

INFORMATION TECHNOLOGY VULNERABILITY ASSESSMENT

TECHNICAL FIELD

The present disclosure relates to vulnerabilities in an information technology infrastructure.

BACKGROUND

Organizations are increasingly shifting to the use of complicated information technology (IT) infrastructures that include computing devices/equipment (e.g., computers, telecommunications equipment, networking equipment, etc.) and software to enhance operations. However, many types of software are subject to security risks (i.e., threats and vulnerabilities). In general, a "threat" is a potential occurrence that can have an undesirable effect on a device resulting in, for example, breaches of confidentiality, theft of data, integrity, a denial of service, etc. "Vulnerabilities" are susceptibilities/flaws in a device (typically software/applications), in a set of procedures, or in anything that creates an opportunity for a threat to occur (i.e., that make it possible for the security of the device and/or organization to be compromised). Vulnerabilities are considered to be at the intersection of a susceptibility or flaw, attacker access to the flaw, and attacker capability to exploit the flaw.

Vulnerabilities may arise due to a variety of reasons. For example, large and complex IT infrastructures increase the probability of flaws and unintended access opportunities. Additionally, the use of common code/software, common operating systems, common hardware, poor password management practices, unchecked user inputs, operating system design flaws, software bugs, and increasing network connectivity and/or increased Internet website browsing all increase the probability that an attacker has or can find the knowledge and tools to exploit a vulnerability within an organizations IT infrastructure.

DESCRIPTION OF EXAMPLE EMBODIMENTS

Overview

Presented herein are vulnerability assessment techniques for highlighting/identifying an organization's information technology (IT) infrastructure security vulnerabilities. For example, a vulnerability assessment system obtains application metadata for each of a plurality of executable applications observed at one or more devices forming part of an organization's IT infrastructure. The application metadata includes unique software identifiers for each of the plurality of executable applications. The vulnerability assessment system obtains global security risk metadata for executable applications observed at the one or more devices. The vulnerability assessment system maps one or more unique software identifiers in the application metadata to global security risk metadata that corresponds to applications identified by the one or more unique software identifiers, thereby generating a vulnerable application dataset.

Example Embodiments

Figure 1:
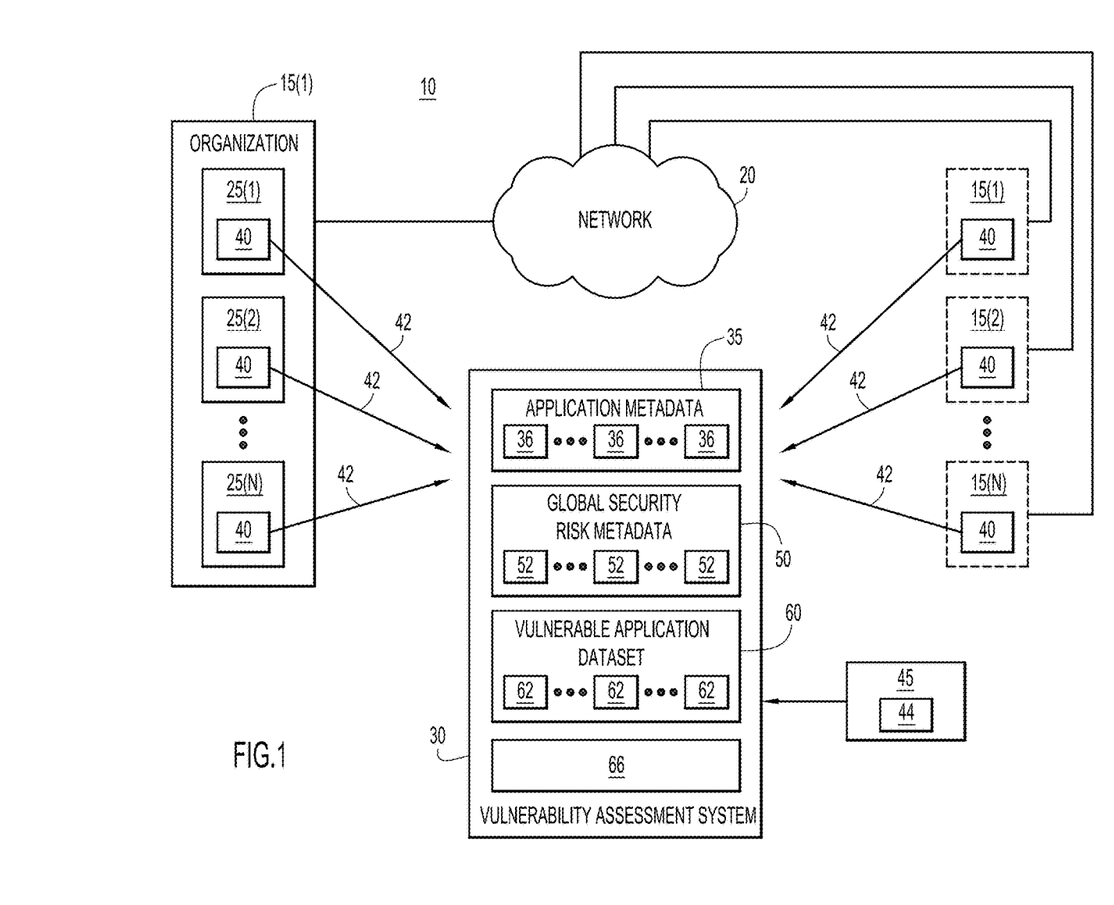
FIG. 1 is a schematic diagram of a system configured to execute vulnerability assessment techniques in accordance with example embodiments presented herein.

FIG. 1 is a diagram illustrating an arrangement (e.g., a system) 10 in which vulnerability assessment techniques in accordance with examples presented herein may be implemented. The arrangement 10 illustrates a plurality of enterprises/organization 15(1)-15(N) that are connected to a network 20. The network 20 may include one or more local area wired and/or wireless networks (LANs), wired and/or wireless wide area networks (WANs), etc. The organizations 15(1)-15(N) each include an information technology (IT) infrastructure formed by a collection of computing and/or networking devices that may be directly and/or indirectly connected to the network 20. For example, FIG. 1 illustrates that organization 15(1) includes endpoints/computing devices and/or networking devices, which are generally illustrated as devices 25(1)-25(N). Organizations 15(1)-15(N) may also include computing and/or networking devices which, for ease of illustration, have been omitted from FIG. 1.

Devices may be compromised by known vulnerabilities in out-of-date, but legitimate software. As such, shown in FIG. 1 is a vulnerability assessment system 30 that is configured to identify and highlight vulnerabilities within an organization's IT infrastructure based on real-time (i.e., real-world) global security risk (e.g., vulnerability and threat) information. Stated another way, the vulnerability assessment system 30 utilizes global data representing real-time security risks (e.g., threats and vulnerabilities) to assess the risk exposure of a specific organization's IT infrastructure. As described further below, the vulnerability assessment system 30 may be configured to determine the most severe vulnerabilities and provide feedback to the organization that, for example, identifies the vulnerabilities that should be prioritized for remediation. Merely for ease of illustration, the vulnerability assessment techniques in accordance with example embodiments presented herein will be primarily described with reference to organization 15(1) and the devices 25(1)-25(N).

To perform vulnerability assessment for organization 15(1), the vulnerability assessment system 30 is configured to obtain application metadata 35 for the applications (e.g., files, software, programs, etc.) observed at the devices 25(1)-25(N). For example, using one or more clients 40 installed in, or connected to, the devices 25(1)-25(N), the vulnerability assessment system 30 obtains a full list 42 of applications and/or files installed in, running on, present at, etc. (collectively and generally referred to herein as executable applications observed at) the devices 25(1)-25(N). This list of observed executable applications may include, for example, running (or executed) programs, moved and/or copied, files, etc. Clients 40 installed in, and/or connected to, devices in organizations 15(2)-15(N), may also provide a full list 42 of executable applications observed at devices located in those organizations.

In accordance with certain examples presented herein, the techniques may analyze binaries being downloaded to a client device from the network traffic flowing through the network in order to obtain application metadata. Therefore, in such examples, the applications may be "observed" using only network-side information.

In one example, the clients 40 may obtain a unique software identifier, such as a cryptographic hash of all the executable applications observed at the devices 25(1)-25(N). As is known, a cryptographic hash, or simply hash, is a globally unique representation of an application. The obtained hashes for each executable application may be provided to the vulnerability assessment system 30 and evaluated to determine if the hashes relate to "clean" or "malicious" applications, based on various traits of the underlying application. A hash may be identified as "clean" (i.e., known to be non-malicious) or "malicious" based on properties of the binary that the hash represents, such as execution of the binary in a trusted environment. For example, a system 45 provides known hashes 44 of various applications. The vulnerability assessment system 30 may perform a comparison of a known hash 44 received from the system 45 with a corresponding hash received from one or more of the devices 25(1)-25(N). Hashes determined to be "clean" may form part of the application metadata 35. As such, the application metadata 35 includes a plurality of entries 36 that each correspond to the artifacts (e.g., hashes, file versions, etc.) of one of the applications installed on the devices 25(1)-25(N). Certain examples may also use third party data to enumerate "clean" and "malicious" applications by the hash. In some examples prevalence counts of the binaries may be used, such as the frequency that the binaries are found on various systems. It is to be appreciated that the above illustrates one example for obtaining unique software identifiers forming part of the application metadata 35 and that other methods may be used in accordance with examples presented herein.

The vulnerability assessment system 30 is also configured to obtain global security risk metadata 50 for one or more of the executable applications observed at one or more of the devices 25(1)-25(N). The global security risk metadata 50 is information representing the real-time (i.e., real-world) security risks (e.g., threats and/or vulnerabilities) that are associated with executable applications of the devices 25(1)-25(N).

The global security risk metadata 50 includes a plurality of entries 52, where each entry 52 corresponds to a specific risk, such as a specific vulnerability, that exists for a specific executable application observed at one or more of the devices 25(1)-25(N). The global security risk metadata 50 may be an aggregate list of known vulnerabilities received from various sources of vulnerability information (e.g., clients 40, third-party sources, etc.) packaged into one repository. This global security risk metadata 50 includes information from public vulnerability databases, such as the National Vulnerability Database (NVD) and/or the Open Vulnerability and Assessment Language (OVAL®) database. In one example, the global security risk metadata entries 52 may include a common vulnerability identifier, such as the Common Vulnerabilities and Exposures (CVE®) identifier. OVAL® and CVE® are registered trademarks of The MITRE Corporation.

The global security risk metadata 50 may also include, for example, indications of the severity of an identified vulnerability, an indication of whether the vulnerability is or has been exploited by attackers, etc. The global security risk metadata entries 52 may also include an application name, application version, a risk score, such as a score assigned in accordance with the Common Vulnerability Scoring System (CVSS), etc.

The vulnerability assessment system 30 is configured to utilize the application metadata 35 and the global security risk metadata 50 to generate a vulnerable application dataset (VAD) 60. As described further below, the vulnerable application dataset 60 may be a list of mappings between a unique software/file identifier (e.g., hash), application name, application version, and corresponding global security risk metadata, such as CVEs.

More specifically, to generate the vulnerable application dataset 60, the vulnerability assessment system 30 is configured to map unique software identifiers in the application metadata 35 to global security risk metadata 50 associated with the underlying application (i.e., the application identified by the unique software identifier). Stated differently, application metadata entries 36, which each uniquely represent an executable application, may be mapped to one or more global security risk metadata entries 52 that represent the global vulnerability information for the executable application. This mapping creates a dataset of entries 62 that correlate the unique software identifier of the executable application (e.g., the hash) to identified security risk information, such as vulnerabilities. The application metadata entries 36 and global security risk metadata entries 52 may be joined, for example, by application name and application version information. Since the entries in the vulnerable application dataset 60 represent a correlation of application metadata to global security risk metadata, the entries 62 in the vulnerable application dataset 60 are sometimes referred to herein as correlated security risk entries 62.

Each correlated security risk entry 62 includes a single unique software identifier (e.g., a hashes such as SHA256, SHA1, SHA512, etc.) that maps to a specific identified security risk (e.g., a single common vulnerability identifier). Since there may be multiple vulnerabilities for an application, there may be multiple correlated security risk entries 62 with the same unique software identifier (i.e., the same application metadata entries 36 maps to multiple global security risk metadata entries 52).

Figure 2A:
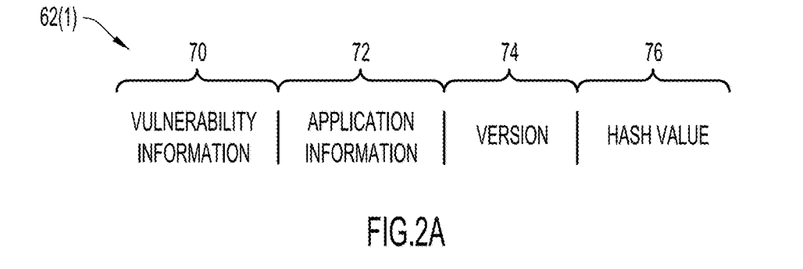
FIGS. 2A and 2B are diagrams illustrating a correlated security risk assessment entry in accordance with example embodiments presented herein.
Figure 2B:
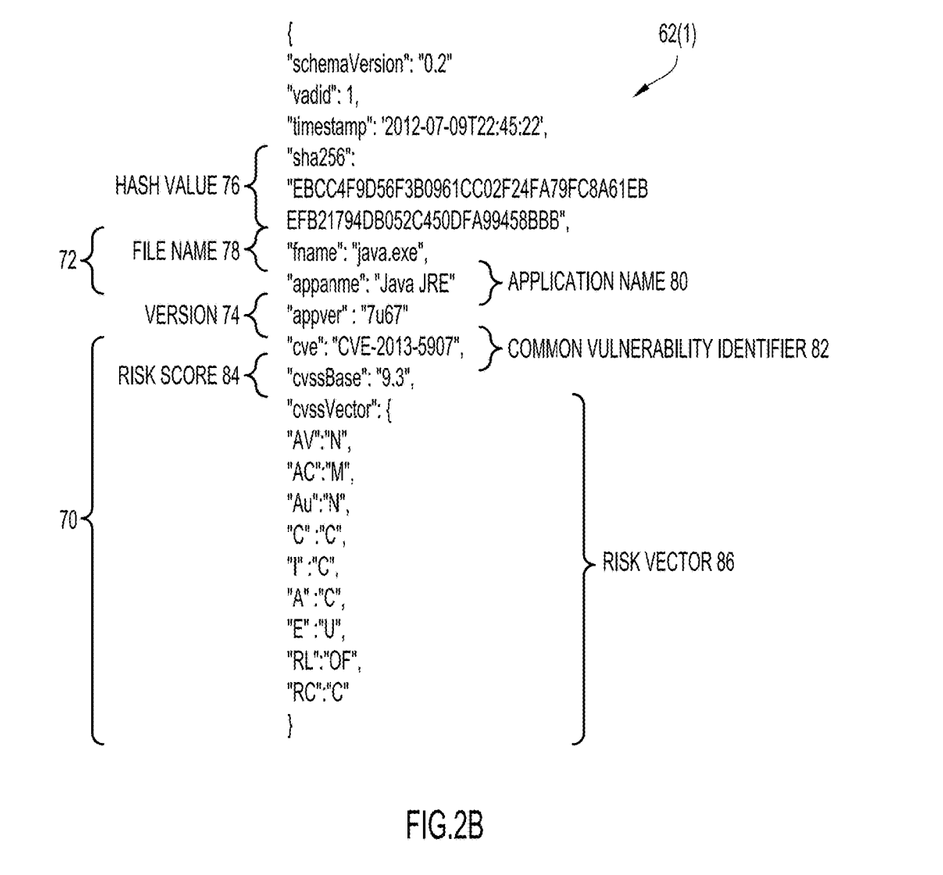

Examples of correlated security risk entries 62 are shown in FIGS. 2A and 2B. After describing FIGS. 2A and 2B, the description will return to FIG. 1.

More specifically, FIG. 2A is a diagram illustrating the general content of an example correlated security risk entry 62(1). As shown, the correlated security risk entry 62(1) includes vulnerability information 70, application information 72, application version 74, and the application hash value 76 (i.e., the unique software identifier for the application).

FIG. 2B is a diagram illustrating further details of the example correlated security risk entry 62(1) of FIG. 2A. As noted, the correlated security risk entry 62(1) includes vulnerability information 70, application information 72, application version 74, and an application hash value 76. The application hash value 76 is, in this example, a SHA256 hash value. The application information 72 includes the file name 78 and the application name 80. The vulnerability information 70 includes a common vulnerability identifier 82, a risk score 84, and a risk score vector 86.

The risk vector 86 is a list of attributes necessary to exploit the vulnerability identified by the common vulnerability identifier 82 (e.g., code indicating whether the vulnerability requires authentication, network accessibility, an end user, etc.). The risk score is computed based on the risk vector 86 and represents the severity of an attack using the vulnerability identified by the common vulnerability identifier 82 (e.g., a score from 1 to 10). In the example of FIG. 2A, the risk vector 86 is a CVSS vector and the risk score is a CVSS score.

Returning to the example of FIG. 1, the vulnerable application dataset 60 is a data set that fundamentally describes which security risks (e.g., vulnerabilities) may affect specific versions of applications, identified by the unique software identifier. That is, as a result of the generation of the vulnerable application data set 60, the vulnerability assessment system 30 has correlated knowledge of: (1) the applications installed at one or more devices 25(1)-25(N) of organization 15(1), (2) the known security risks that affect those applications, and (3) information about the security risks. By analyzing this information, the vulnerability assessment system 30 can deliver a real-world risk assessment of the security risks of devices 25(1)-25(N) and provide remediation information to the organization.

The vulnerable application dataset 60 may analyzed by the vulnerability assessment system 30 in a number of different ways to assess the security risks of devices 25(1)-25(N) and provide remediation information to the organization. For example, the vulnerability assessment system 30 may be configured to provide (display, email, text message, etc.) security risk assessment information to an individual associated with the organization 15(1), such as an IT manager, including a list of hosts running vulnerable software, a list of vulnerable executable applications (i.e., vulnerable applications being run by, or installed on) observed at one or more devices 25(1)-25(N). The list of vulnerable hosts and/or applications could be sorted by risk severity (e.g., based on risk score), sorted based on a determined likelihood of an attack, etc. The hosts and/or applications appearing in a list could also be accompanied by additional information that is relevant to an individual associated with the organization 15(1).

For example, the vulnerability assessment system 30 may be configured to provide an individual associated with the organization 15(1) a list of devices most likely to be compromised or security risk assessment information in the form of a summary or detailed reports of global trends in compromised machines and associated vulnerable software (e.g., cluster malware compromises with vulnerable software to infer malware X is using compromise Y). The vulnerability assessment system 30 could also create predictive indicators of compromise. That is, based on what is occurring in the real world (i.e., the global vulnerability information), the vulnerability assessment system 30 could inform an individual associated with the organization 15(1) of the "most likely" avenue(s) of attack for the organization 15(1). This effectively allows the organization 15(1) to prioritize which vulnerabilities to correct.

A predictive indicator of compromise may be created by profiling all devices connected (or reporting to) the vulnerability assessment system 30, categorizing devices into different categories, and quantifying the likelihood that a device would be compromised based on a comparison of devices in different categories. For example, it may be determined that out of a total of six-thousand (6,000) devices, three-thousand (3,000) devices are running a specific vulnerable application, while the other 3,000 devices are not running the vulnerable application. The 6,000 devices are categorized as (1) running the vulnerable application, or (2) not running the vulnerable application. It is determined that of the 3,000 devices running the vulnerable application, two-thousand (2000) have been attacked/compromised, while only one-hundred (100) of the devices not running the vulnerable application have been compromised. Therefore, it may be determined that the devices running the specific vulnerable application are twenty (20) times more likely to be attacked.

The above example illustrates categorization of devices based on whether or not the device is running a given vulnerable application. The vulnerability assessment system 30 may also be configured to generate additional sub-categories using, for example, operating systems, device types, industry vertical information, etc. The vulnerability assessment system 30 may also be configured to generate indications of: an increased probability of compromise, an increased probability of compromise by generic botnets, an increased probability of compromise by targeted attacks, an increased probability of targeting for data exfiltration, etc., depending upon the kind of malware currently being used to attack an identified vulnerability. Therefore, in accordance with examples presented herein, devices can be classified, for example, as "containing vulnerable software X" and "not containing vulnerable software X." In addition, a "percentage of all machines that have vulnerable software X that are compromised" and a "percentage of all machines that do not have vulnerable software X that are compromised" can be computed. In a basic instantiation, a ratio of the two numbers may be computed to show the increased likelihood of compromise for systems running the vulnerable package. More refined versions would compare vulnerable software to more similar machines than the general population, such as those running the same operating system, using the same end-user language, in the same industry, or using the same security packages.

In summary, the vulnerability assessment system 30 may be configured to profile a plurality of devices to identify the applications, operating system, configuration, etc. of the plurality of devices. The vulnerability assessment system 30 may then be configured to categorize the plurality of profiled devices into one or more categories (e.g., based on whether or not the device is running a specific application, operating system, etc.). Based on the categorization of the plurality of profiled devices, the vulnerability assessment system 30 may then be configured to quantify (e.g., generate a score indicating) the likelihood that a device running a vulnerable application would be compromised.

In certain examples, a client (e.g., devices 25(1)-25(N) or any endpoint) containing one or more files may query the vulnerability assessment system 30 for the disposition of the client's files. The vulnerability assessment system 30 may respond to the client with an indication that a file is either "clean" (i.e., normal/non-harmful) or "malicious" (i.e., potentially harmful). The vulnerability assessment system 30 may also be configured to perform secondary analysis to provide further indications of whether or not the client files are vulnerable to compromise. The primary query, the response, and the secondary analysis may be stored in a central database 66.

The central database 66 can be queried and counts made of the number of compromised devices/files. All devices running software can be classified by those possessing a given piece of software and those that do not have a given piece of software. A fraction or percentage of systems with a given piece of software that are compromised can be computed, and a fraction of systems without a given piece of software that are compromised can be computed.

The vulnerability assessment system 30 may also use the vulnerable application dataset 60 to initiate one or more actions to mitigate an avenue of attack. For example, if the vulnerability assessment system 30 determines that a device 25(1)-25(N) is running a piece of software that is vulnerable, but it is unknown if adversaries are using it as an avenue of attack, the vulnerability assessment system 30 could trigger deeper inspections on that single set of processes. In one arrangement, information about vulnerable software can be provided to systems that would redirect traffic from the vulnerable hosts through more rich inspection systems (deep packet inspection, etc.). Additionally, vulnerable applications can be blocked from executing, but allowed to continue to exist on the system; vulnerable applications can be blocked from generating any network traffic, but allowed to execute; and/or vulnerable applications may be allowed to access data on the local hard drive, but not allowed to access files on remote file shares. Other actions may include, for example, the triggering of deep packet inspection in the network such that the traffic from the vulnerable host is examined more closely to detect threats.

Figure 3:
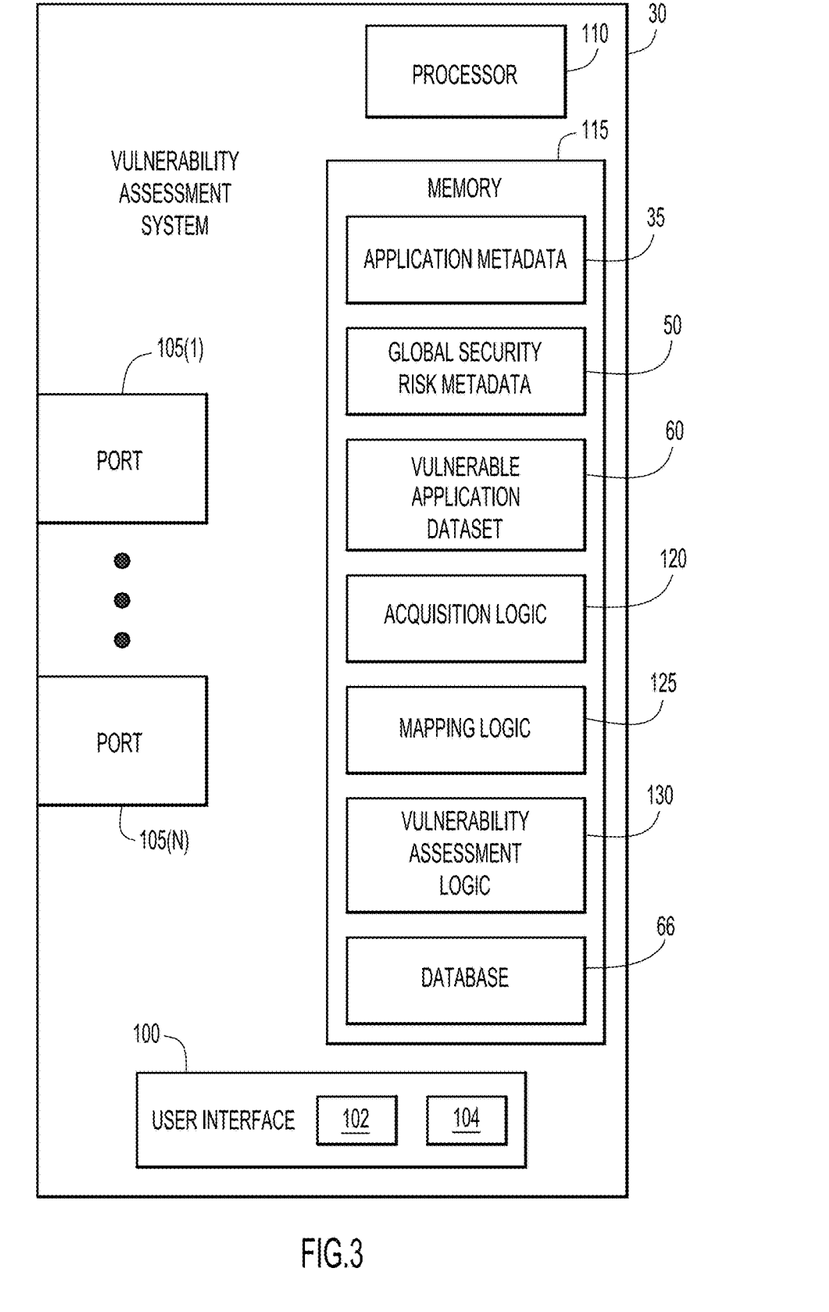
FIG. 3 is a block diagram illustrating a vulnerability assessment system in accordance with example embodiments presented herein.

Reference is now made to FIG. 3. FIG. 3 is a block diagram of one implementation of vulnerability assessment system 30 configured to execute techniques in accordance with examples presented herein. As shown, vulnerability assessment system 30 has a plurality of ports 105(1)-105(N), a processor 110, and a memory 115. Memory 115 stores the application metadata 35, the global security risk metadata 50, the database 66, and the vulnerable application dataset 60. Memory 115 also includes acquisition logic 120, mapping logic 125, and vulnerability assessment logic 130. The vulnerability assessment system 30 may also have a user interface 100 comprising, for example, a display screen 102 and one or more elements 104 enabling user interaction with the device (e.g., keyboard, mouse, touchscreen, etc.).

Memory 115 may include read only memory (ROM), random access memory (RAM), magnetic disk storage media devices, optical storage media devices, flash memory devices, electrical, optical, or other physical/tangible (e.g., non-transitory) memory storage devices. The processor 110 is, for example, a microprocessor or microcontroller that executes instructions for the acquisition logic 120, mapping logic 125, and vulnerability assessment logic 130. Thus, in general, the memory 115 may comprise one or more tangible computer readable storage media (e.g., a memory device) encoded with software comprising computer executable instructions and when the software is executed (by the processor 110) it is operable to perform the operations described herein for execution of the vulnerability assessment techniques.

More specifically, execution of the acquisition logic 120 enables the vulnerability assessment system 30 to obtain the data for populating the application metadata 35 and the global security risk metadata 50. That is, the acquisition logic 120 enables the vulnerability assessment system 30 to operate with clients 40 and other data sources to obtain the application metadata 35 and the global security risk metadata 50.

Additionally, execution of mapping logic 125 enables the vulnerability assessment system 30 to create, update, or otherwise modify the vulnerable application dataset 60. That is, the mapping logic 125 is executed to map the unique software identifiers in the application metadata 35 to corresponding global security risk metadata, remove entries 62 from the vulnerable application dataset, etc. Execution of the vulnerability assessment logic 130 enables the vulnerability assessment system 30 to analyze the vulnerable application dataset 60 and deliver security risk assessment information (e.g., a real-world risk assessment of the vulnerabilities of devices 25(1)-25(N) and/or provide remediation information) to an individual associated with the organization 15(1) shown in FIG. 1.

In certain examples, security risk assessment information generated by the vulnerability assessment system 30 may be delivered to one or more other devices via the ports 105(1)-105(N). For example, the vulnerability assessment system 30 could be a physical or virtual server that connects to another computing device (not shown in FIG. 3) that is accessible to an individual associated with organization 15(1). In such examples, the vulnerability assessment system 30 could transmit security risk assessment information to the computing device for display to the individual associated with organization 15(1) as part of one or more graphical user interfaces (GUIs).

In other examples, the vulnerability assessment system 30 may be a device, such as a computer, that is directly accessible by an individual associated with organization 15(1). In this example, the vulnerability assessment system 30 may be configured to display one or more GUIs at the display screen 102. That is, one or more GUIs may be displayed at the display screen 102 to provide the security risk assessment information to the individual associated with organization 15(1). For ease of illustration, the display of a GUI in accordance with the examples presented herein may refer to the display of a GUI at the vulnerability assessment system 30 or at another device that receives security risk assessment information from the vulnerability assessment system 30.

Figure 4:
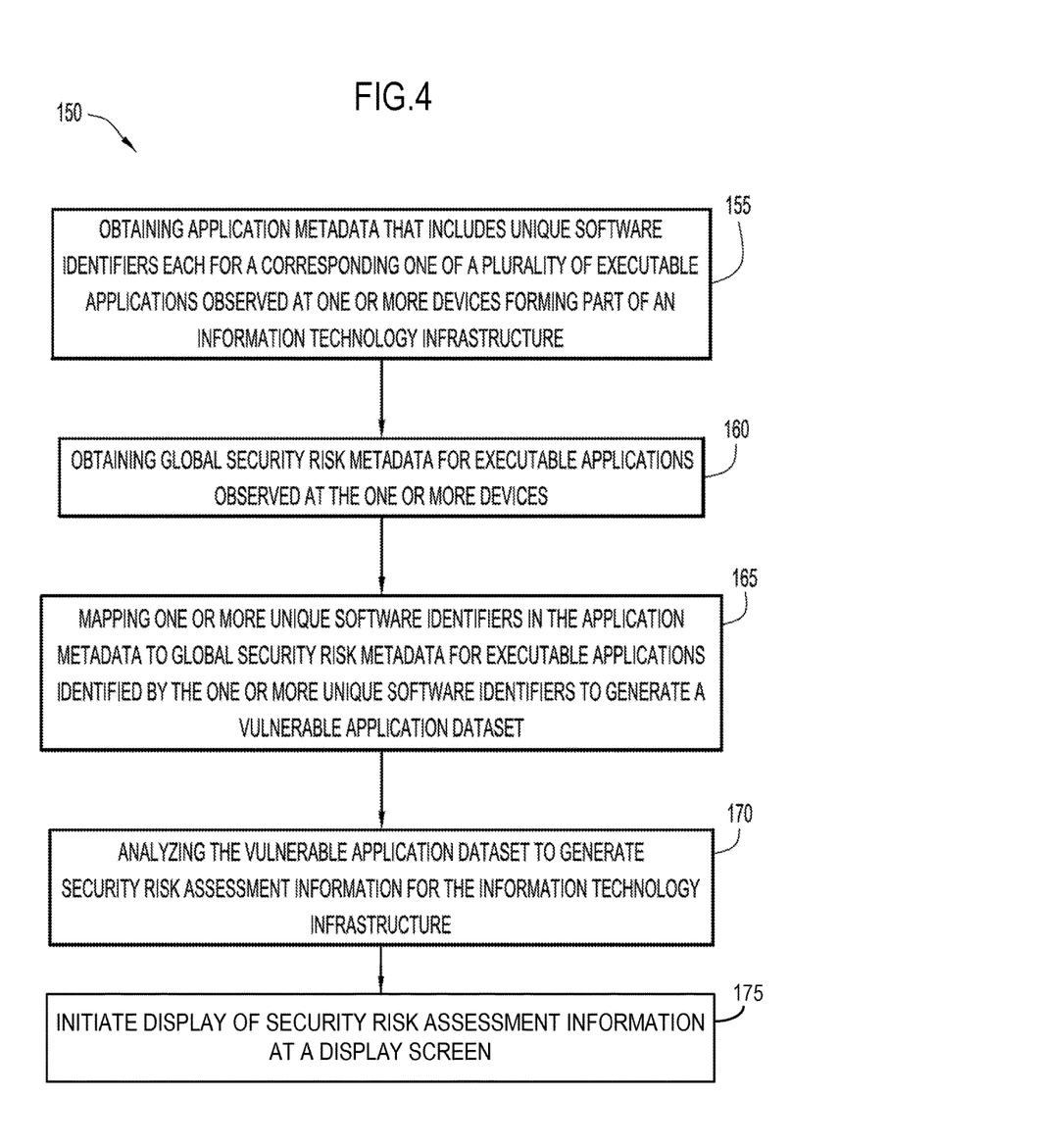
FIG. 4 is a high-level flowchart of a method in accordance with example embodiments presented herein.

FIG. 4 is a high-level flowchart of a method 150 in accordance with examples presented herein. For ease of illustration, method 150 is described with reference to the arrangement of FIG. 1.

Method 150 begins at 155 where the vulnerability assessment system 30 obtains application metadata 35 for each of a plurality of executable applications observed at one or more devices 25(1)-25(N) (i.e., the devices forming part of the IT infrastructure of 15(1)). The application metadata 35 includes unique software identifiers for each of the plurality of executable applications. At 160, the vulnerability assessment system 30 obtains global security risk metadata 50 for executable applications observed at the one or more devices. At 165, the vulnerability assessment system 30 maps one or more unique software identifiers in the application metadata 35 to global security risk metadata 50 that corresponds to applications identified by the one or more unique software identifiers, thereby generating a vulnerable application dataset 60. At 170, the vulnerability assessment system 30 analyzes the vulnerable application dataset 60 to generate security risk assessment information for the organization's information technology infrastructure. At 175, the vulnerability assessment system 30 initiates display of the security risk assessment information at a display screen.

In summary, in one form, a method is provided comprising: obtaining a plurality of unique software identifiers each for a corresponding one of a plurality of executable applications observed at one or more devices forming part of an information technology infrastructure; obtaining global security risk metadata for one or more executable applications observed at the one or more devices; mapping one or more unique software identifiers to global security risk metadata obtained for one or more executable applications that are identified by the one or more unique software identifiers to generate a vulnerable application dataset; and analyzing the vulnerable application dataset to generate security risk assessment information for the information technology infrastructure.

In another form, an apparatus is provided comprising: one or more network interface ports; a memory; and a processor coupled to the one or more network interface ports and the memory, wherein the processor is configured to: obtain a plurality of unique software identifiers each for a corresponding one of a plurality of executable applications observed at one or more devices forming part of an information technology infrastructure; obtain global security risk metadata for one or more executable applications observed at the one or more devices; map one or more unique software identifiers to global security risk metadata obtained for one or more executable applications that are identified by the one or more unique software identifiers to generate a vulnerable application dataset; and analyze the vulnerable application dataset to generate security risk assessment information for the information technology infrastructure.

In still another form, one or more non-transitory computer readable storage media are provided, encoded with software comprising computer executable instructions and when the software is executed (by a processor), it is operable to: obtain a plurality of unique software identifiers each for a corresponding one of a plurality of executable applications observed at one or more devices forming part of an information technology infrastructure; obtain global security risk metadata for one or more executable applications observed at the one or more devices; map one or more unique software identifiers to global security risk metadata obtained for one or more executable applications that are identified by the one or more unique software identifiers to generate a vulnerable application dataset; and analyze the vulnerable application dataset to generate security risk assessment information for the information technology infrastructure.

The above description is intended by way of example only.

What is claimed is:

1. A computer-implemented method comprising:
    obtaining, by a vulnerability assessment device, a plurality of unique software identifiers each for a corresponding one of a plurality of executable applications observed at one or more devices separate from the vulnerability assessment device and forming part of an information technology infrastructure;
    obtaining, by the vulnerability assessment device, global security risk metadata for one or more executable applications observed at the one or more devices;
    mapping, by the vulnerability assessment device, one or more unique software identifiers to global security risk metadata obtained for one or more executable applications that are identified by the one or more unique software identifiers to generate a vulnerable application dataset;
    analyzing, by the vulnerability assessment device, the vulnerable application dataset to generate security risk assessment information for the information technology infrastructure;
    categorizing, by the vulnerability assessment device, each of the one or more devices either as running a vulnerable executable application or as not running the vulnerable executable application; and
    based on the categorizing, quantifying, by the vulnerability assessment device, a likelihood that the one or more devices that are running the vulnerable executable application could be compromised by computing a ratio of:
        a number of the one or more of the devices that are running the vulnerable executable application and that are compromised; and
        a number of the one or more devices that are not running the vulnerable executable application and that are compromised.

2. The method of claim 1, wherein analyzing the vulnerable application dataset to generate security risk assessment information comprises:
    analyzing the vulnerable application dataset to identify currently exploitable vulnerabilities in the one or more executable applications that are identified by the one or more unique software identifiers.

3. The method of claim 1, wherein analyzing the vulnerable application dataset to generate security risk assessment information comprises:
    generating remediation information to proactively prevent one or more security risks associated with the one or more executable applications that are identified by the one or more unique software identifiers.

4. The method of claim 1, wherein analyzing the vulnerable application dataset to generate security risk assessment information comprises:
    generating a host-vulnerability score for at least one of the one or more devices.

5. The method of claim 1, wherein mapping comprises:
    mapping the one or more unique software identifiers to global security risk metadata using application name information and application version information.

6. The method of claim 1, further comprising sub-categorizing the one or more devices by operating system, device type, or industry vertical information.

7. The method of claim 1, wherein the unique software identifiers are cryptographic hash values computed for each of the one or more executable applications observed at the one or more devices.

8. An apparatus comprising:
    one or more network interface ports;
    a memory; and
    a processor coupled to the one or more network interface ports and the memory, wherein the processor is configured to:
        obtain a plurality of unique software identifiers each for a corresponding one of a plurality of executable applications observed at one or more devices forming part of an information technology infrastructure;
        obtain global security risk metadata for one or more executable applications observed at the one or more devices;
        map one or more unique software identifiers to global security risk metadata obtained for one or more executable applications that are identified by the one or more unique software identifiers to generate a vulnerable application dataset;
        analyze the vulnerable application dataset to generate security risk assessment information for the information technology infrastructure;
        categorize each of the one or more devices either as running a vulnerable executable application or as not running the vulnerable executable application; and
        based on the categorization, quantify a likelihood that the one or more devices that are running the vulnerable executable application could be compromised by computing a ratio of:
            a number of the one or more of the devices that are running the vulnerable executable application and that are compromised; and
            a number of the one or more devices that are not running the vulnerable executable application and that are compromised.

9. The apparatus of claim 8, wherein to analyze the vulnerable application dataset to generate security risk assessment information, the processor is configured to:

analyze the vulnerable application dataset to identify currently exploitable vulnerabilities in the one or more executable applications that are identified by the one or more unique software identifiers.

10. The apparatus of claim 8, wherein to analyze the vulnerable application dataset to generate security risk assessment information, the processor is configured to:
generate remediation information to proactively prevent one or more security risks associated with the one or more executable applications that are identified by the one or more unique software identifiers.

11. The apparatus of claim 8, wherein to analyze the vulnerable application dataset to generate security risk assessment information, the processor is configured to:
generate a host-vulnerability score for at least one of the one or more devices.

12. The apparatus of claim 8, wherein to map one or more unique software identifiers in the application metadata to global security risk metadata for executable applications identified by the one or more unique software identifiers, the processor is configured to:
map the one or more unique software identifiers to global security risk metadata using application name information and application version information.

13. The apparatus of claim 8, wherein the processor is further configured to sub-categorize the one or more devices by operating system, device type, or industry vertical information.

14. The apparatus of claim 8, wherein the unique software identifiers are cryptographic hash values computed for each of the one or more executable applications observed at the one or more devices.

15. One or more non-transitory computer readable storage media encoded with software comprising computer executable instructions such that when the software is executed by a computing device, the computing device is operable to:
obtain a plurality of unique software identifiers each for a corresponding one of a plurality of executable applications observed at one or more devices separate from the computing device and forming part of an information technology infrastructure;
obtain global security risk metadata for one or more executable applications observed at the one or more devices;
map one or more unique software identifiers to global security risk metadata obtained for one or more executable applications that are identified by the one or more unique software identifiers to generate a vulnerable application dataset;
analyze the vulnerable application dataset to generate security risk assessment information for the information technology infrastructure;
categorize each of the one or more devices either as running a vulnerable executable application or as not running the vulnerable executable application; and
based on the categorization, quantify a likelihood that the one or more devices that are running the vulnerable executable application could be compromised by computing a ratio of:
a number of the one or more of the devices that are running the vulnerable executable application and that are compromised; and
a number of the one or more devices that are not running the vulnerable executable application and that are compromised.

16. The non-transitory computer readable storage media of claim 15, wherein the instructions operable to analyze the vulnerable application dataset to generate security risk assessment information comprise instructions operable to:
analyze the vulnerable application dataset to identify currently exploitable vulnerabilities in the one or more executable applications that are identified by the one or more unique software identifiers.

17. The non-transitory computer readable storage media of claim 15, wherein the instructions operable to analyze the vulnerable application dataset to generate security risk assessment information comprise instructions operable to:
generate remediation information to proactively prevent one or more security risks.

18. The non-transitory computer readable storage media of claim 15, wherein the instructions operable to analyze the vulnerable application dataset to generate security risk assessment information comprise instructions operable to:
generate remediation information to proactively prevent one or more security risks associated with the one or more executable applications that are identified by the one or more unique software identifiers.

19. The non-transitory computer readable storage media of claim 15, wherein the instructions operable to map one or more unique software identifiers in the application metadata to global security risk metadata for executable applications identified by the one or more unique software identifiers comprise instructions operable to:
map the one or more unique software identifiers to global security risk metadata using application name information and application version information.

20. The non-transitory computer readable storage media of claim 15, wherein the software further comprises instructions such that when the software is executed by a computing device, the computing device is operable to:
sub-categorize the one or more devices by operating system, device type, or industry vertical information.

* * * * *

UNITED STATES PATENT AND TRADEMARK OFFICE
CERTIFICATE OF CORRECTION

PATENT NO. : 9,928,369 B2  
APPLICATION NO. : 14/617184  
DATED : March 27, 2018  
INVENTOR(S) : Anthony H. Grieco Page 1 of 1

It is certified that error appears in the above-identified patent and that said Letters Patent is hereby corrected as shown below:

On the Title Page

Column 1, Item (73), Assignee should be "Cisco Technology, Inc.".

Signed and Sealed this
Eighth Day of May, 2018

Andrei Iancu
*Director of the United States Patent and Trademark Office*